Aug. 11, 1936.   R. OHLSEN ET AL   2,050,457
SEALING MACHINE
Filed March 1, 1933   10 Sheets-Sheet 6
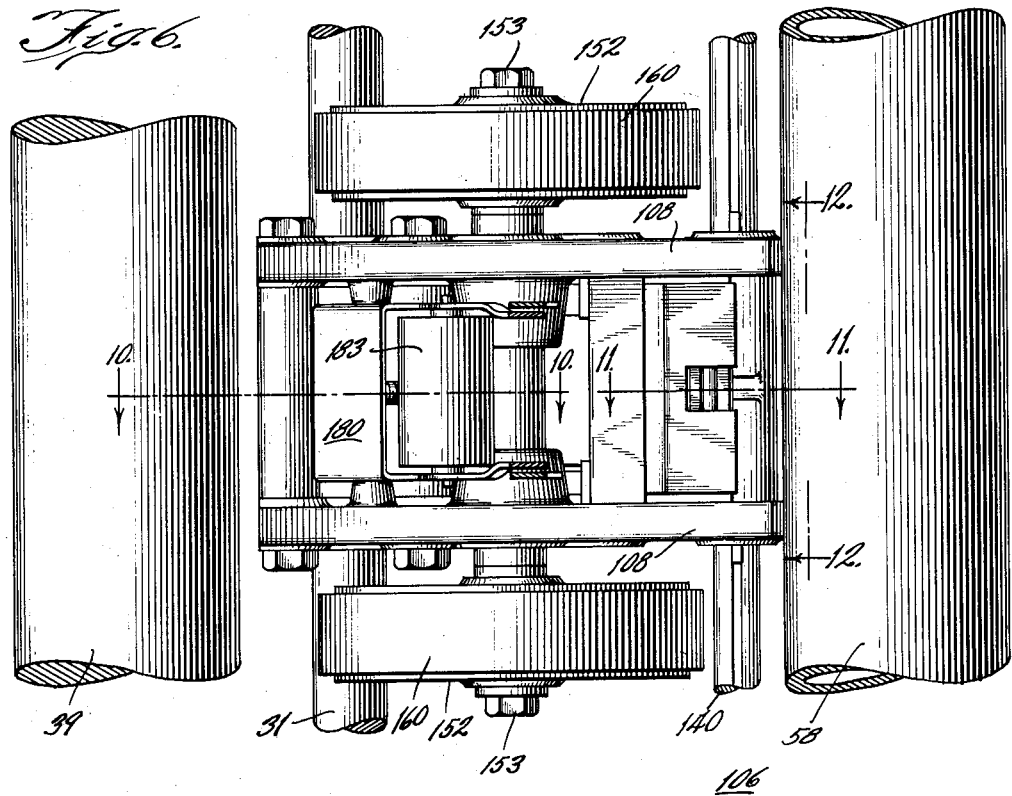
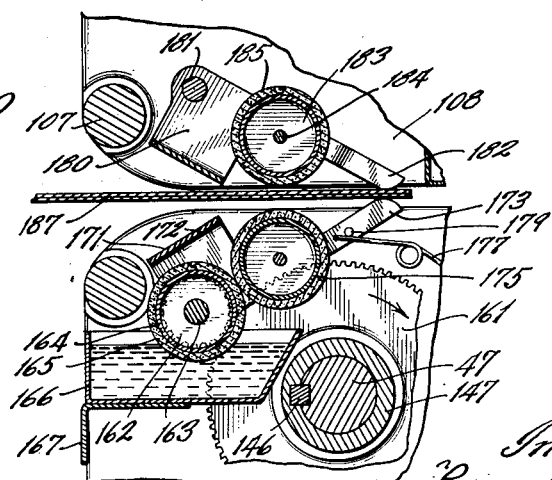

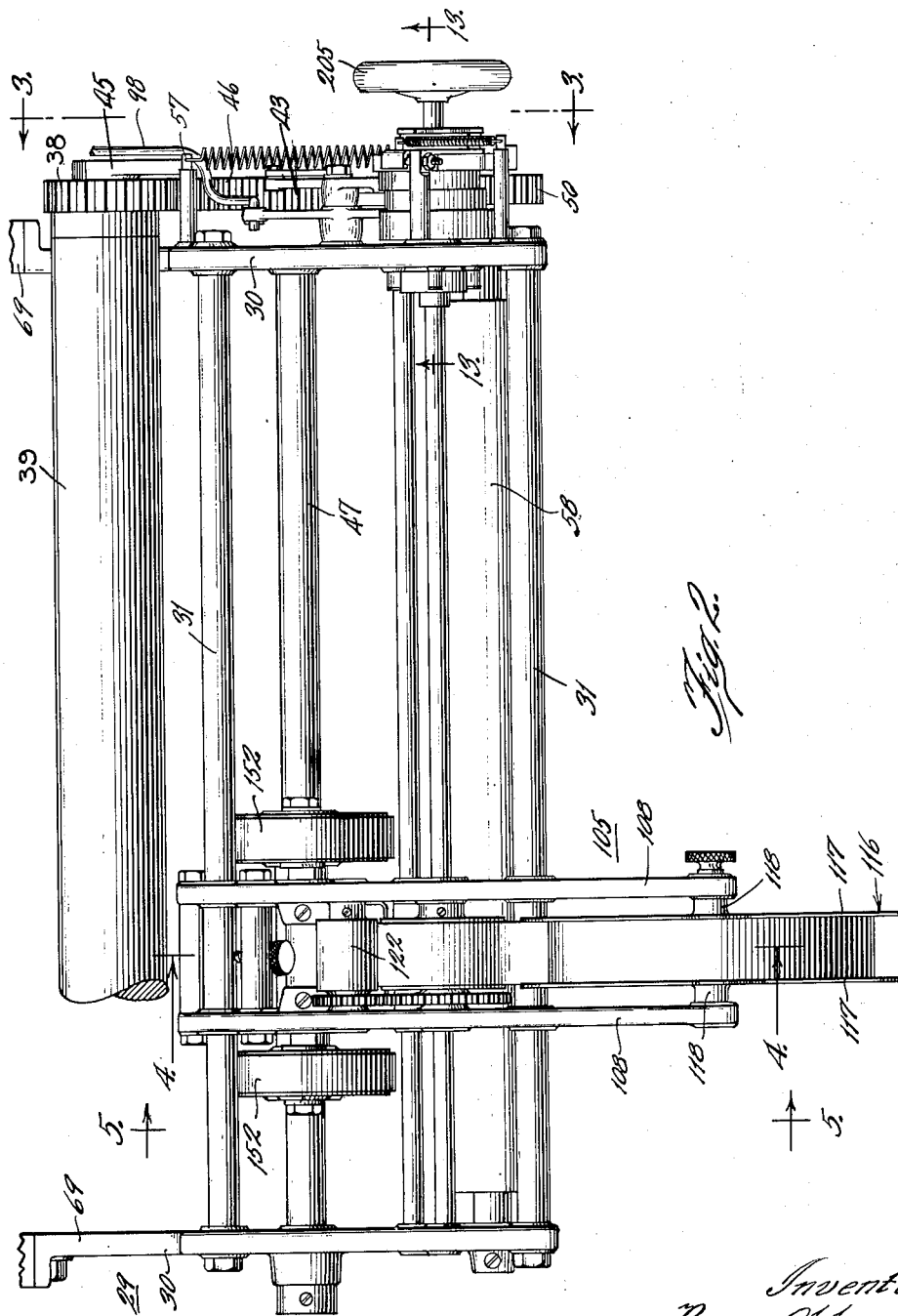

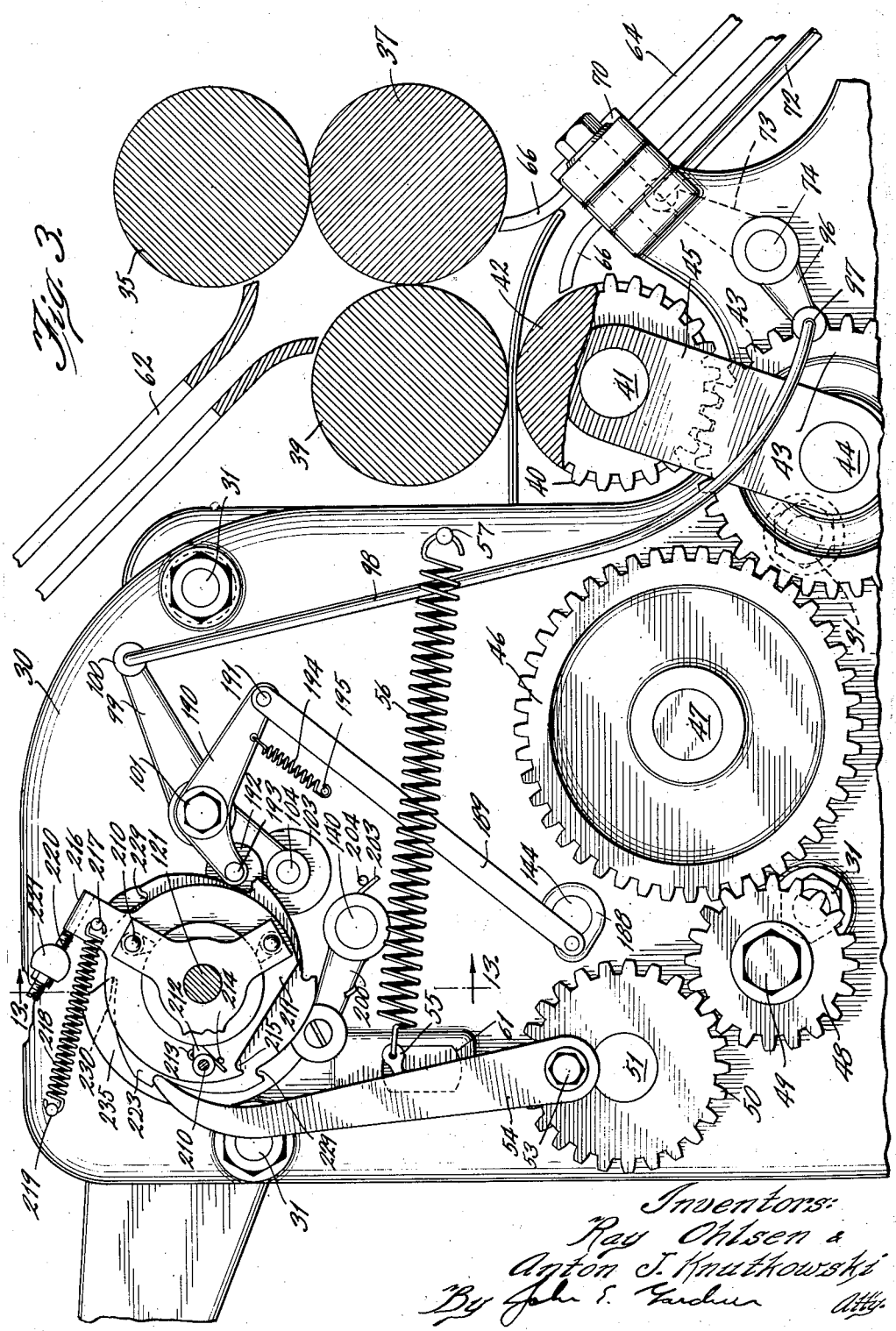

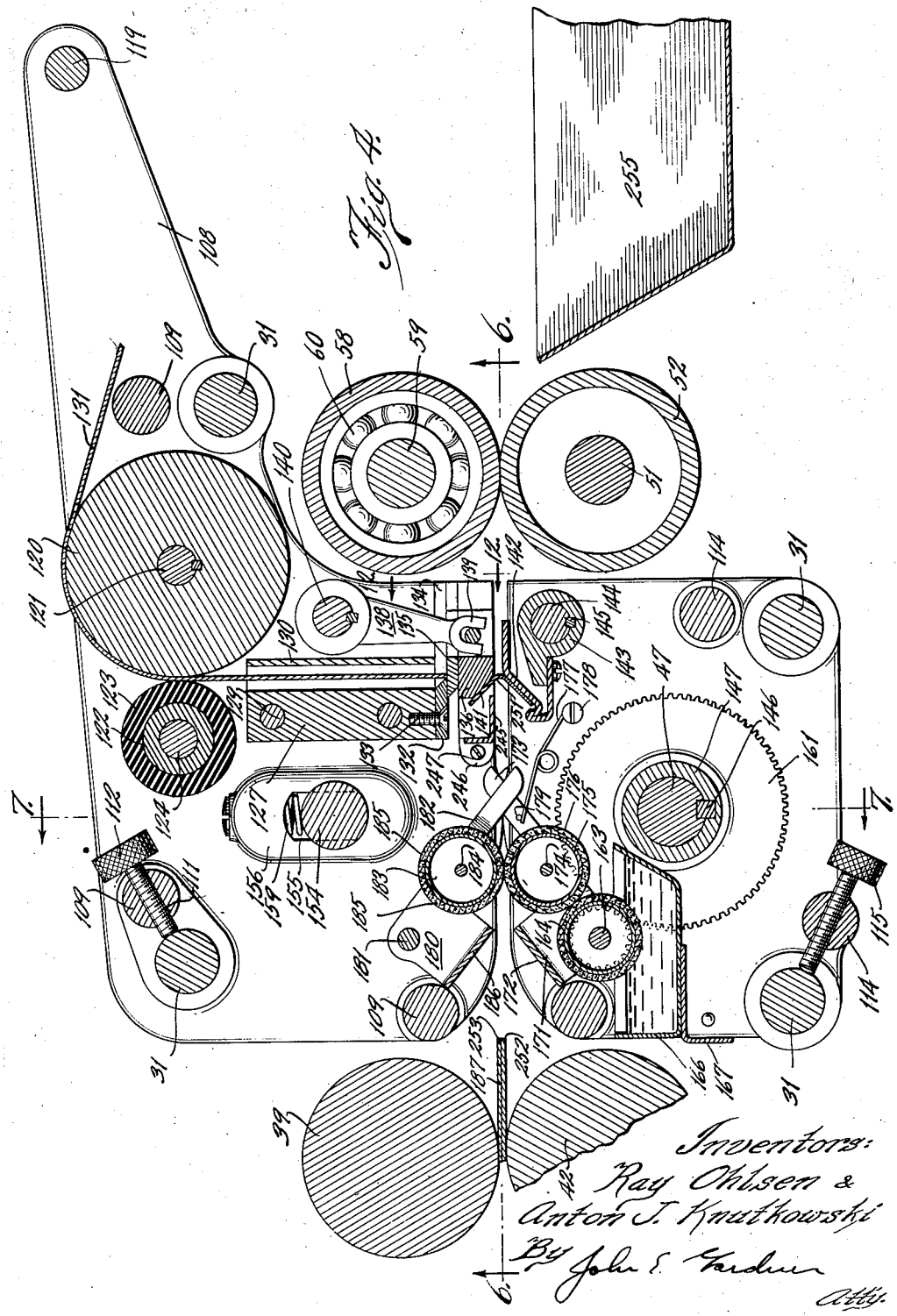

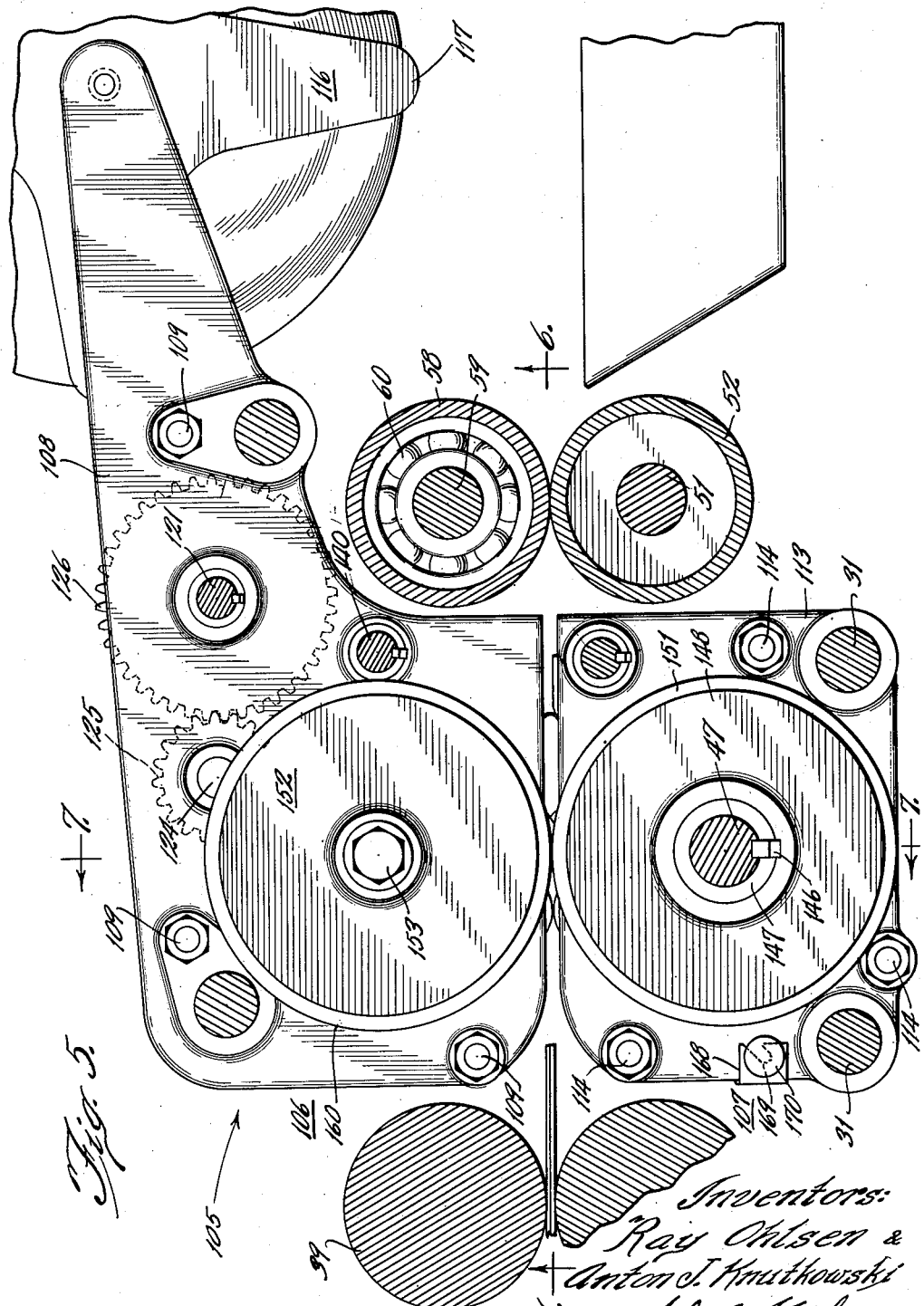

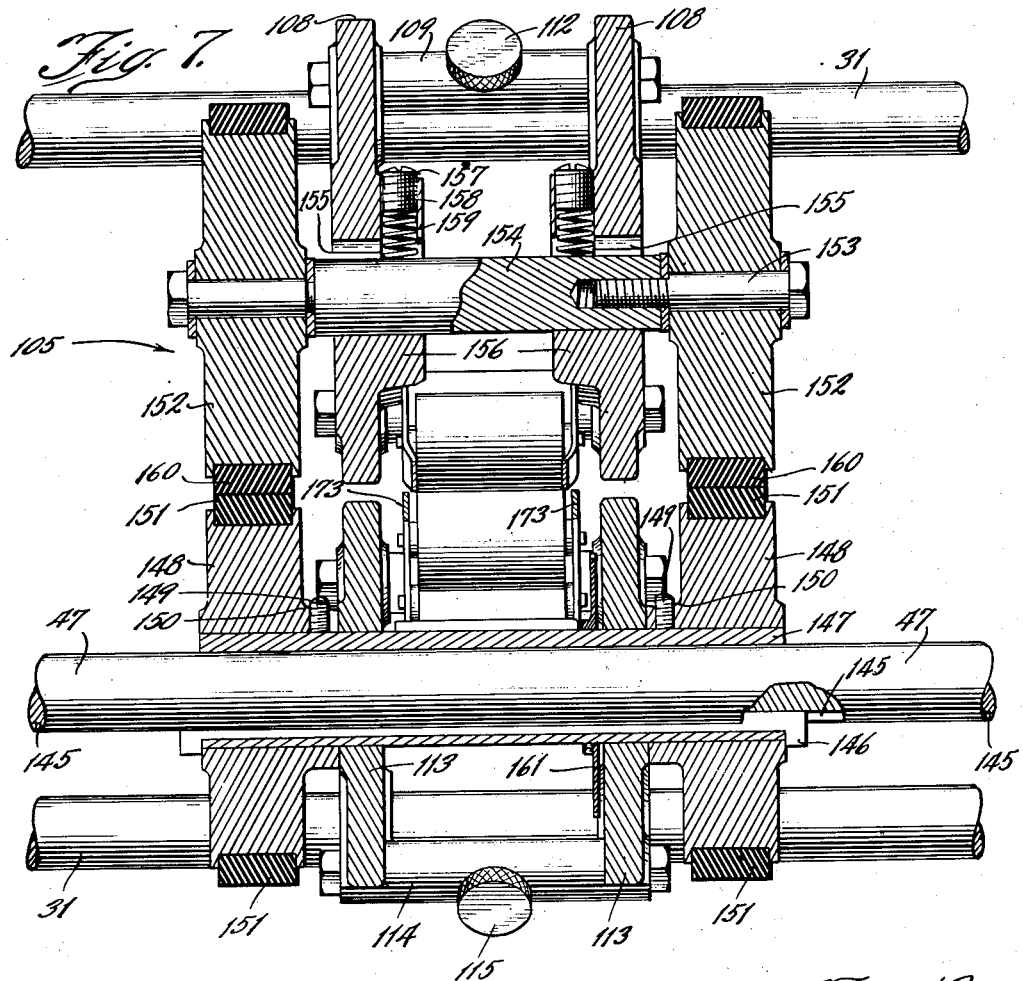
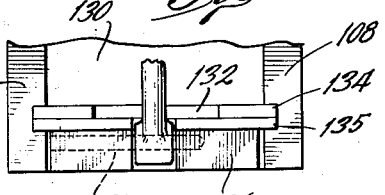
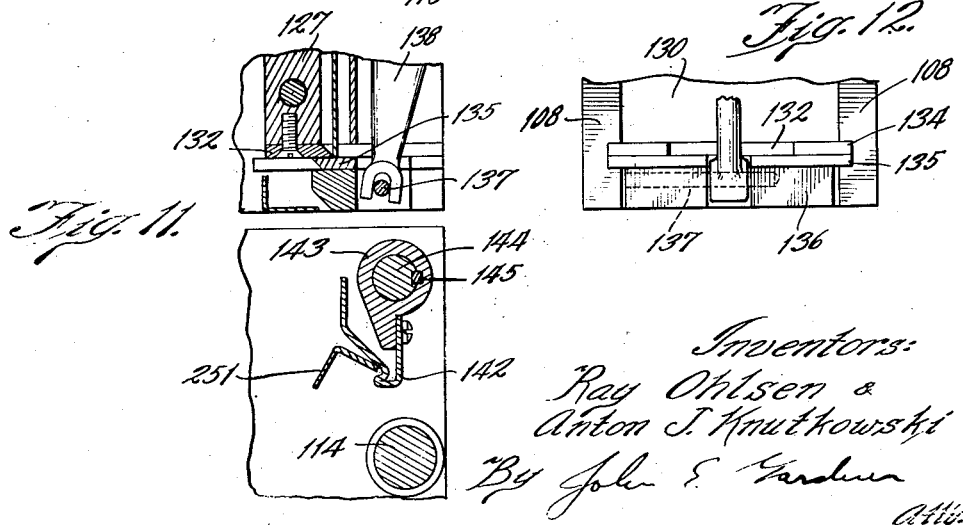

Aug. 11, 1936.   R. OHLSEN ET AL   2,050,457
SEALING MACHINE
Filed March 1, 1933   10 Sheets-Sheet 8
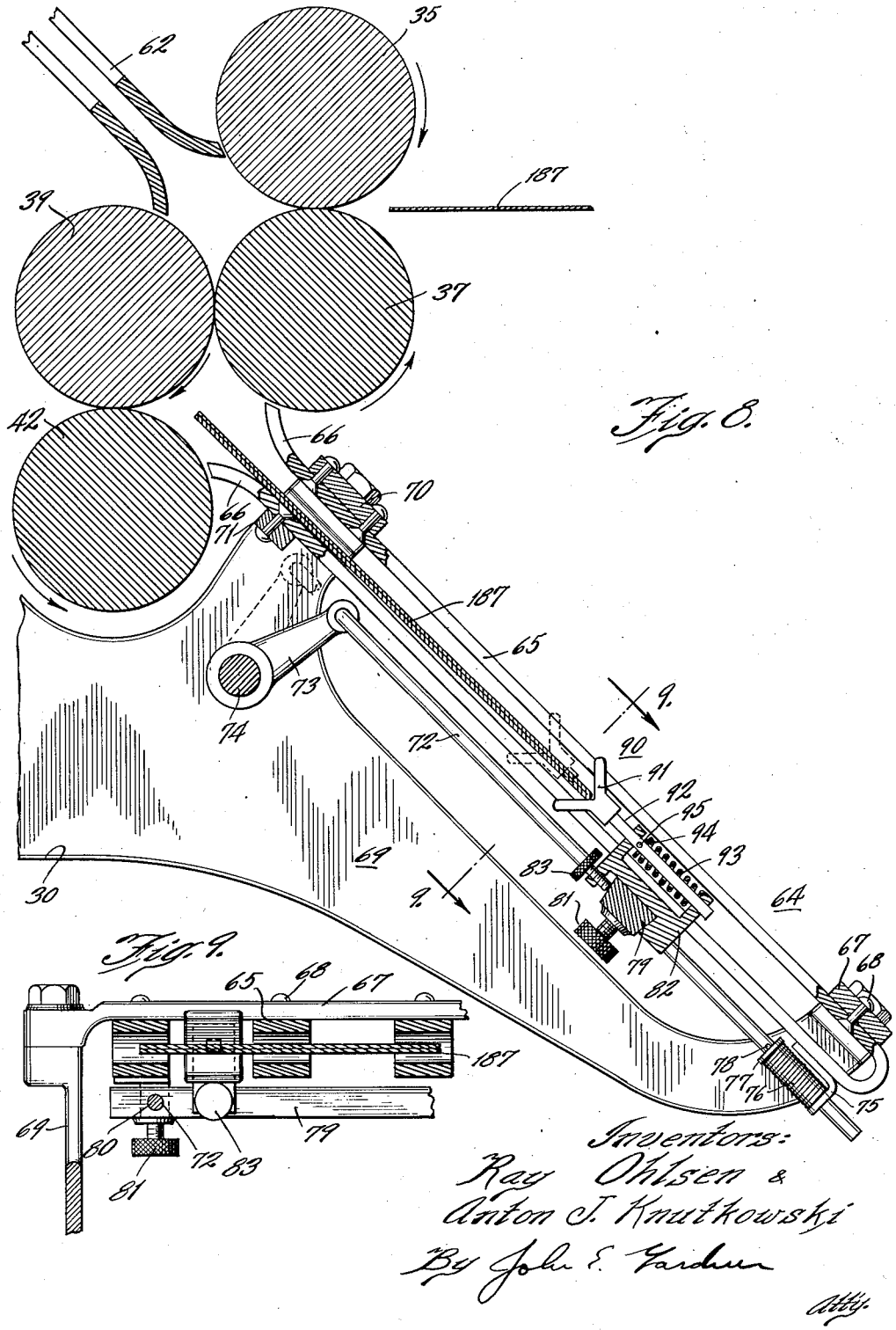

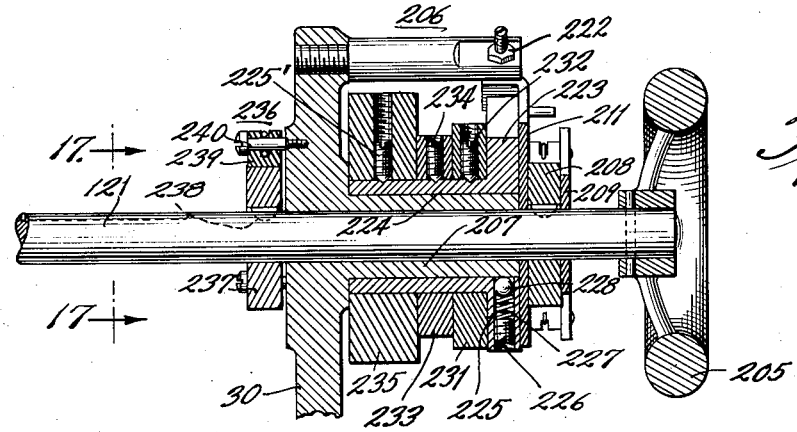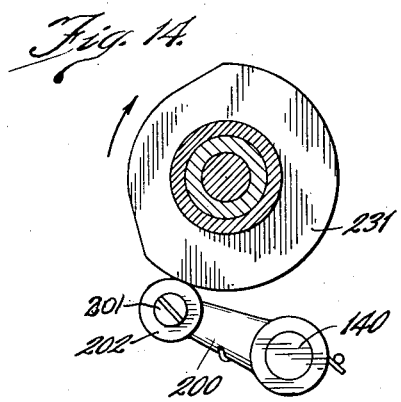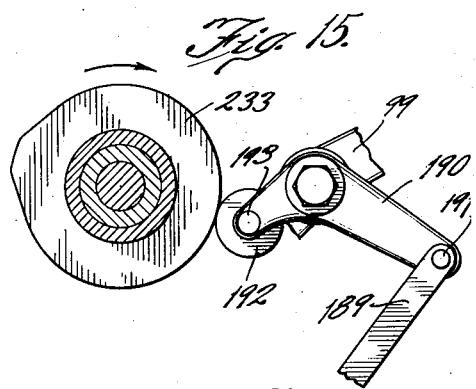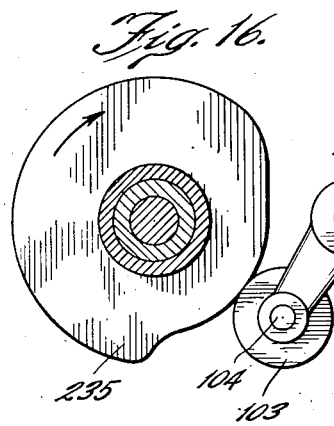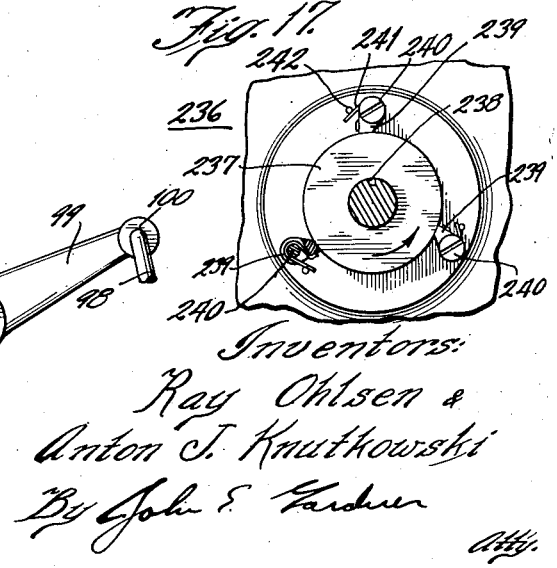

Aug. 11, 1936.  R. OHLSEN ET AL  2,050,457
SEALING MACHINE
Filed March 1, 1933  10 Sheets-Sheet 10

Inventors:
Ray Ohlsen &
Anton J. Knuthowski
By John F. Gardner
Atty.

Patented Aug. 11, 1936

2,050,457

UNITED STATES PATENT OFFICE 2,050,457

SEALING MACHINE

Ray Ohlsen, Downers Grove, and Anton J. Knutkowski, Chicago, Ill., assignors to Dexter Folder Company, New York, N. Y., a corporation of New York (1934)

Application March 1, 1933, Serial No. 659,138

40 Claims. (Cl. 216—25)

The present invention relates in general to sealing machines.

One of the objects of the present invention is to provide novel means for applying a seal to the open edges of a folder while the folder is being produced and delivered.

Another object is to provide novel means whereby precancelled postage stamps may be employed as seals.

Another object is to provide means for automatically framing the postage stamps so that stamps may be taken from a roll and cut along the roll perforations between each stamp.

Another object is to provide a sealing machine which may be attached to any ordinary and well-known type of folding machine and driven directly therefrom.

Another object is to provide means for automatically eliminating any seals that may not have been used as the machine is operating.

A further object is to provide means for interrupting the feed of the folders through the feeding machine except when a seal is in position.

Still another object is to provide means for interrupting the feeding action of the sealing mechanism at any time feeding of the folders is interrupted.

Still another object is to provide means for moistening the edges of the folders to which the seals are to be applied, rather than the gummed seals themselves.

A still further object is to provide means for moistening only the portion of the folder edge to which the seal is to be applied.

A still further object is to so construct the sealing device that when it is attached to a well-known type of folding machine, the folded matter will be fed therefrom through the sealing mechanism in generally the same direction.

Still another object is to accomplish the foregoing in a simple, inexpensive and positive manner.

There are other objects of our invention which together with the foregoing will be described in the detailed specification that is to follow taken in conjunction with the accompanying drawings forming a part hereof.

In practicing our invention we provide a sealing device frame that is adapted to be attached to the frame of any well-known type of folding machine which forms a mounting for our improved sealing mechanism.

Our invention, in accordance with one aspect thereof, comprises a plurality of feeding rollers and a reversing device for reversing the position of the folder after it comes from the folding machine so as to feed it through the sealing mechanism with the open edges forward; a feeding mechanism by which a gummed tape or a roll of precancelled stamps is fed into the sealing mechanism proper; a sealing mechanism consisting of means for cutting the tape at predetermined points, forming it into the shape of a seal, maintaining it in position, applying water to the edges of the folder and applying the seal thereto; and a stacking mechanism by which the sealed folders fed from the sealing mechanism are stacked. The feeding rollers, tape feeding mechanism, mechanism for applying water to the folder edges and for applying the seal thereto, are all geared directly and derive power from the folding machine itself. The feeding mechanism of the folding machine thus serves also to feed the sealing machine.

The accompanying drawings illustrate certain preferred embodiments of our invention and show it applied to a well known type of machine which is commonly known in the trade as the "Cleveland". Obviously, any other type of folding machine may be employed.

Referring now to the drawings:

Fig. 2 is an enlarged fragmentary plan view of our sealing machine proper;

Fig. 3 is a side elevation of our improved sealing machine taken along the line 3—3 of Fig. 2 looking in the direction of the arrows;

Fig. 4 is a sectional elevation of the same taken along the line 4—4 of Fig. 2 looking in the direction of the arrows;

Fig. 5 is another sectional elevation of the same taken along the line 5—5 of Fig. 2;

Fig. 6 is a horizontal sectional view of our improved sealing machine taken along the line 6—6 of Figs. 4 and 5 looking in the direction of the arrows;

Fig. 7 is a vertical sectional view of our sealing mechanism taken along the line 7—7 of Figs. 4 and 5;

Fig. 8 is an enlarged fragmentary vertical sectional view taken along the line 8—8 of Fig. 1 looking in the direction of the arrows;

Fig. 9 is a fragmentary sectional view taken along the line 9—9 of Fig. 8 looking in the direction of the arrows and showing certain details of the reversing panel.

Fig. 10 is a detail sectional view of that portion of our sealing machine which applies water to the folder edges and is taken along the line 10—10 of Fig. 6 looking in the direction of the arrows;

Fig. 11 is a detail sectional view of the seal cutting and ejecting mechanism taken along the same line as Fig. 4 and also along the line 11—11 of Fig. 6 and showing the seal ejector swung downwardly to ejecting position;

Fig. 12 is a detail elevation of the seal cutting mechanism and is taken along the line 12—12 of Fig. 6 looking in the direction of the arrows;

Fig. 13 is an enlarged detail section of the mechanism which controls the feeding of the seals, the seal cutting mechanism, etc., and is taken along the line 13—13 of Fig. 2 looking in the direction of the arrows;

Fig. 14 is an elevation of the control mechanism showing generally the shape of the cam which actuates the knife;

Fig. 15 is a similar view of the cam which actuates the seal ejector;

Fig. 16 is a similar view of the cam which actuates the reversing panel trip;

Fig. 17 is a detail sectional view taken along the line 17—17 of Fig. 13 looking in the direction of the arrows, and shows a one way brake;

In the drawings like reference characters refer to similar parts in the various figures.

Figure 1:
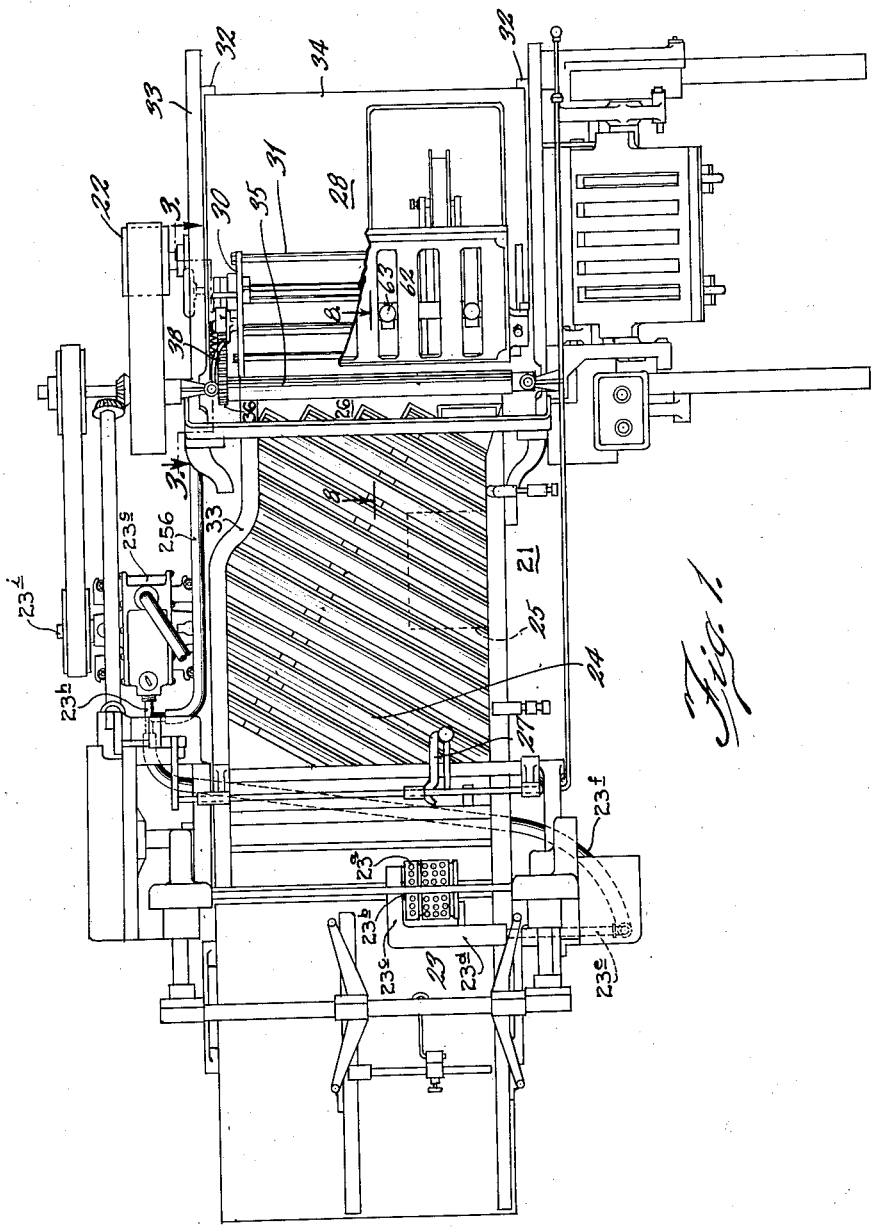
Fig. 1 is a top plan view of a "Cleveland" folding machine with our improved sealing machine or mechanism for attaching seals to the folders secured thereto.

The reference character 21 designates generally any well-known type of folding machine, for example, a "Cleveland" folding machine, which is provided with a driving motor driving a main drive shaft pulley 22. The folding machine is provided with a feeding mechanism 23 of any usual well-known type, and diagonally placed or mounted feeding rollers 24 for feeding sheets shown by the dotted rectangle 25 in the direction of the folding mechanism 26. The folding machine is provided with the usual automatic trip 27 which is operative to stop the machine in the event the pneumatic feed 23 feeds more than one sheet at a time.

Our improved sealing machine is designated generally by the reference character 28 and comprises a metal frame indicated generally by the reference character 29, being provided with end pieces 30 generally rectangular in shape and tied together by four tie rods 31. The side members 30 rest upon a supporting plate 34 (Fig. 1) and are suitably secured thereto. The supporting plate 34 extends between the angles 32 of the main folding machine frame 33 and are suitably attached thereto.

The folding machine 21 is provided with a feeding roller 35 toward one end thereof, having a spur gear 36 attached to one of its ends, and adapted to mesh with a spur gear (not shown) immediately below it, which in turn is attached to the diametrically opposed feeding roller 37 rotatable in bearings in the main folding frame 33. The spur gear secured to the feeding roller 37 also meshes with a spur gear 38 secured to a feeding roller 39 rotatable in bearings in the main folding machine frame 33. The spur gear 38 meshes with a spur gear 40 mounted upon a shaft 41 directly, and carrying a feeding roller 42.

The shaft 41 is rotatable in bearings in the main folding machine frame 33. The feeding rollers 35 and 37 are thus diametrically opposed, as are the feeding rollers 39 and 42. The spur gear 40 meshes with a spur gear 43 mounted upon a shaft 44 rotatable in bearings in a swinging bracket 45 supported or pivoted about the shaft 41. The spur gear 43 is adapted to mesh with a spur gear 46 secured to a shaft 47 and the bracket 45 is retained in position for this purpose by any suitable means. The shaft 47 is rotatable in bearings in the end pieces 30 of the main sealing device frame 29. The spur gear 46 meshes with a spur gear 48 rotatably mounted upon a stub shaft 49 secured to one of the end plates 30. The pinion gear 48 meshes with a spur gear 50 splined in any suitable manner to a shaft 51 rotatable in bearings in the end pieces 30 of the main sealing device frame 29. The shaft 51 carries a feeding roller 52 suitably secured thereon. The spur gear 50 has a pin suitably affixed thereto which furnishes a bearing or pivotal mounting for a pawl 54.

The pawl 54 is provided with an eye 55 to which one end of a tension spring 56 is secured. The other end of the tension spring 56 is secured through an opening in a pin 57 affixed to one of the end pieces 30 (Fig. 3). The feeding roller 52 is in frictional contact with a feeding roller 58 rotatably mounted upon a shaft 59 by means of ball or anti-friction bearings 60. The shaft 59 is slidably mounted in slotted openings 61 in the end pieces 30 of the main sealing device frame 29.

Springs or other resilient means not shown are employed to urge the shaft 59 in the direction of shaft 51 so as to bring about good frictional contact between the rollers 58 and 52 (see Figs. 3, 4 and 5).

The main folding machine frame carries a folding panel 62 suitably secured thereto and positioned immediately after the feeding rollers 35 and 37. The folding panel 62 is one of a number that is usually provided, depending upon the number and manner in which it is desired to fold the material passing through the folding machine.

The folding action is old and well known and will merely be described in a general way to enable one to understand how our present sealing machine may be employed in conjunction therewith.

The folding panel 62 is to be considered as the last folding panel and completes the folding operation. This folding panel is provided with an adjustable stop 63 suitably secured thereto in any desired manner.

A reversing panel designated generally by reference character 64 is mounted below the feeding rollers 37 and 39 between the feeding rollers 37 and 42 and comprises a number of strips of metal 65 bent back upon themselves in the shape of a U with flaring ends 66 adjacent the feeding rollers 37 and 42. The strips 65 are suitably secured together at their lower ends by means of a strap member 67 by means of rivets 68. The strap member 67 is bolted to the extensions 69 of the end pieces 30. The upper ends of the strips 65 are suitably riveted to a strap 70 in a similar manner to the strap 67. The strap 70 is suitably secured to the extensions 69 of the end pieces 30 of the main sealing device frame. The other legs of the strap 67 are suitably riveted or fastened to a cross strap 71 which is also bolted to the extensions 69 of the main sealing device frame.

Two operating rods 72 are mounted at the sides of the reversing panel. Each operating rod has one end rotatably secured to a crank arm 73 suitably affixed to a shaft 74 rotatable in bearings provided in the extensions 69 of the end pieces of the main sealing device frame. The other end of each rod 72 passes through an opening in a bracket 75 suitably secured to one of the U-shaped straps 65 of the reversing panel.

A compression spring 76 encircles each of the rods 72 and seats against the brackets 75 and washers 77 which are suitably held in place by eye pins 78 penetrating rods 72.

Each rod 72 telescopes an opening 80 in an adjustable bar 79. The adjustable bar 79 is held in position on the rod 72 by means of thumbscrews 81 suitably threaded into the bar 79.

A sliding bracket 82 of a general H-shape has its lower depending flanges formed so as to co-operate and slide crossways on the supporting bar 79. The bracket 82 is positioned on the bar 79 adjustably by means of a setscrew 83.

The upstanding flanges of the bracket 82 carry resiliently mounted stopping means indicated broadly at 90 (Fig. 8) which includes a V-shaped element 91 affixed to a rod 92 slidable in openings provided in the upstanding flanges.

A compression spring 93 encircles the rod 92 and is seated against one of said upstanding flanges, the other end bearing against a washer 94 mounted on the rod 92 and held in place by means of a pin 95 penetrating said rod. By this construction the stopping element 91 is resiliently positioned in the space between two of the adjacent U-shaped metal strips 65 constituting the reversing panel (Fig. 8).

Bracket 82 permits the stopping element 91 to be positioned between any of the adjacent strips 65 in accordance with the size of the folder passing through the panel 64.

The shaft 74 is provided with another operating lever arm 96 at one of its extremities which provides a pivotal bearing 97 for a connecting rod 98, (see Figs. 2 and 3) the other end of which is rotatably secured to a lever arm 99 at 100. Lever arm 99 is rotatably mounted about a stub shaft 101 which is suitably fastened to one of the end pieces 30 of the main sealing device frame 29. The other end of the lever arm 99 provides a bearing for a wheel or roller 103 rotatable upon a stub shaft 104 secured to the lever arm 99 (see Fig. 16).

An auxiliary frame designated generally by the reference character 105 is adjustably supported upon the cross rods or spacers 31 which connect the end pieces 30 of the main sealing device frame together. The auxiliary frame 105 consists essentially of two sections designated generally by reference characters 106 and 107. The upper portion 106 of the auxiliary frame 105 consists of two end pieces 108 of a general angular shape held together and spaced by spacers 109. The top spacer rod 109 is provided with a threaded opening 111 (Fig. 4) to receive a thumbscrew 112 which passes therethrough and bears against one of the spacer members 31 of the main sealing device frame. The thumbscrew 112 serves to hold the upper portion 106 of the auxiliary frame 105 in position with respect to transverse movement on the rods 31 (Fig. 4).

The lower portion 107 of the auxiliary frame 105 consists of two rectangular shaped members 113 held together and spaced apart by the spacers 114. The lower frame 107 is slidably mounted upon the rods 31 constituting the spacers of the main sealing device frame and co-operates with the upper portion 106 of the auxiliary frame 105.

The lower portion 107 of the auxiliary frame is likewise adapted to be held in position by means of a thumbscrew 115 penetrating a threaded opening through the lower spacer 114 and bearing against one of the rods 31 of the main frame.

The upper portion 106 of the auxiliary frame carries a reel 116 which comprises two similarly shaped elements 117, each of which has a boss 118 formed integrally therewith. The reel is supported upon by, and rotatable about, a shaft 119 which is threaded into one side of one of the end pieces 108. The shaft 119 may be provided with a knurled head for easy assembly. The reel 116 carries the sealing tape which may be a roll of precancelled stamps or any tape formed of material which might be combined with a solvent to make it self adherent.

A tape feeding roller 120 which may be constructed of wood or other suitable material is suitably splined to a shaft 121 extending through the upper portion 106 of the auxiliary frame and having bearings in the end pieces 30 of the main sealing device frame 29. The shaft 121 is the main control shaft for the sealing mechanism.

A feeding roller 122 is mounted adjacent the tape roller 120 and bears against it. The roller 122 is provided with a friction face 123 of rubber or other suitable material and is mounted upon a shaft 124 rotatable in bearings in the end pieces 108 of the upper portion of the auxiliary frame. One end of the shaft 124 is provided with a spur gear 125 adapted to mesh with a spur gear 126 splined to the main control shaft 121.

A knife supporting and tape guide block 127 is suitably secured between the end pieces 108 by means of dowel pins 129. A metal element 130 is bent about the knife supporting element 127 and spaced therefrom so as to form a guide for the sealing tape 131. The upper knife blade 132 of general U-shaped contour along its cutting edge is suitably fastened to the knife block 127 by means of counter-sunk machine screws 133. The legs of the U-shaped knife blade 132 rest in slots 134 formed along the inner surface of the end pieces 108. The lower knife blade 135 is also of a general U-shape, and its extending legs slide in slots 134 of the end pieces. The lower knife blade 135 has a block 136 attached thereto in any suitable manner. The block 136 has an opening in the central portion thereof (see Fig. 12) with a pin penetrating one side of the block and extending into a socket past the opening therein.

A crank arm 138 having a U-shaped jaw 139 spanning the pin 137 is splined on a shaft 140 rotatable in bearings in the end pieces 30 of the main frame. It is to be noted that the block 136 has a diagonal face 141 adapted to co-operate with a seal supporting element and ejector 142 to form the seal suitably so that the seal will be properly positioned on the folder. The seal supporting element and ejector 142 is mounted upon a hub 143 suitably attached to the shaft 144 by means of a feather key 145. The shaft 144 penetrates openings in the end pieces 113 and is rotatable in bearings provided in the main sealing device end pieces 30.

The shaft 47 is provided with a keyway 145 extending its full length. The key 146 slides therein and serves to secure a sleeve 147 which telescopes the shaft 47 thereto. The sleeve 147 has affixed thereto on either side of the end pieces 113 feeding wheels 148 by means of setscrews 149 threaded into openings in the bosses 150 formed integrally with the feeding wheels 148. Each of the feeding wheels 148 is provided with a friction face 151 of rubber or other suitable material. The friction wheels 148 co-operate with similar friction wheels 152 resiliently mounted in the upper portion 106 of the auxiliary frame 105. The friction wheels 152 rotate upon stub shafts 153 which are threaded into a supporting shaft 154 slidably mounted in slotted openings 155 in the end pieces 108. The shaft 154 is flattened at the points where it passes through the slotted openings 155.

A boss 156 is formed integrally with each of the inner surfaces of the end pieces 108. Each boss is provided with a threaded opening 157 into which a setscrew 158 is screwed and bears against a compression spring 159 telescoping the opening in the boss. The other end of the compression spring 159 bears against the shaft 154 in this manner. The upper feeding wheels 152 which are also provided with friction faces 160 are resiliently forced against the driven feeding wheels 148. A spur gear 161 (Figs. 4 and 10) is suitably secured to the sleeve 147 and meshes with a spur gear 162 splined to a shaft 163 rotatable in bearings in the end pieces 113 of the lower portion 107 of the auxiliary frame 105. The shaft 163 carries a watering roller 164 which is provided with a water retaining surface of felt or other suitable material 165. The watering roller 164 runs within a water container 166 which may be supported in any convenient manner between the end pieces 113, such as by brackets 167.

Each bracket 167 is provided with an angular extension 168 (Fig. 5) having a slotted opening therein through which a clamping thumbscrew 170 is adapted to penetrate and support the same by clamping it against the frame end pieces 113 into which the screw 170 is threaded.

A roller lifting bracket 171 having a general U-shaped cross sectional contour and provided with a rectangular shaped surface 172 is rotatably mounted on the shaft 163 (see Figs. 4, 6, 7 and 10). The roller lifting bracket 171 is also provided with two legs or fingers 173 which extend upwardly into the upper portion 106 of the auxiliary frame 105. The legs 173 also furnish a support for a shaft 174 which is mounted rotatably in the legs. The shaft 174 carries a roller 175 affixed thereto, having a water retaining surface 176 about its outer surface bearing against the surface of the watering roller 164. It will be seen that the bracket 171 permits the swinging movement of the roller 175 about the shaft 163.

A lifting spring 177 is fastened to each of the end pieces 113 of the lower portion 107 by means of a screw 178. The other ends of the spring 177 bear against pins 179 in the legs 173 of the roller lifting bracket 171.

Another roller lifting bracket 180, of a shape similar to the shape of the lifting bracket 171 is pivoted about a shaft 181 which is supported in the end pieces 108 of the upper portion 106 of the auxiliary frame. The roller lifting bracket 180 is also provided with two legs or fingers 182 which extend toward the lower portion 107 of the auxiliary frame and are adjacent to the legs 173 of the other roller lifting bracket 171.

A roller 183 is mounted upon a shaft 184 which is rotatably supported in the legs 182 of the roller lifting bracket 180 in a position directly above the roller 175. The roller 183 is provided with a water retaining surface 185 of felt or other suitable material. It will be seen that this mounting of the roller 183 permits it to swing in the bracket 180 with the shaft 181 as a pivot. The roller 183 is held in contact with the roller 175 by gravity, although springs similar to the spring 177 might be employed if desired.

The bracket 180 is also provided with a rectangular surface 186 which co-operates with rectangular shaped surface 172 of the bracket 171 which may form a guide to direct folders such as the folder 187 between the rollers 175 and 183. It is to be noted also that the shape of the end pieces 108 and 113 at the adjacent corners is arcuate so as to guide the folders 187 toward the rollers 175 and 183.

The ejector shaft 144 is provided with an operating bracket suitably secured to one end thereof. A connecting rod 189 is pivotally attached to the operating bracket 188 and extends to a bell crank 190 and is pivotally secured at 191 to one end thereof. The bell crank 190 is rotatably mounted on the shaft 101. The other end of the bell crank is provided with a roller 192 rotatably mounted on a stub shaft 193 threaded therein (see Fig. 3).

A tension spring 194 has one end secured to the bell crank lever 190 and the other end to a pin 195 set in one of the end pieces 30. The tension spring 194 serves to direct the roller 192 in an upward direction against the cam member.

The knife actuating shaft 140 is provided with a crank arm 200 (Figs. 3 and 14) suitably secured thereto. The end of the crank arm carries a stub shaft 201 threaded therein which provides a bearing for a roller 202.

A spring 203 extends over the crank arm 200 and is bent around the shaft 140 and past a pin 204 in one of the end pieces 30 to actuate the roller 202 in an upward direction against its cam control element (Fig. 3).

The shaft 121 which drives the tape feeding mechanism is provided with a hand wheel 205 suitably secured to one end thereof to permit its manual adjustment. Control mechanism designated generally by the reference character 206 is mounted about the shaft 121 (see Figs. 3 and 13).

The end piece 30 (Fig. 13) of the main sealing device frame is provided with a quill 207 formed integrally therewith through which the shaft 121 penetrates. A driven disk 208 is suitably keyed to the shaft 121 and serves to drive it. A three armed disk or clutch supporting element 209 is mounted loosely on the shaft 121 and is secured by means of screws 210 threaded into a disk 211 to the driving element of the control mechanism. The screws 210 furnish bearings for dogs 212 which are held against the periphery of the driven disk 208 by means of springs 213 fastened about the disk 211 and about the screws 210 by pins 214. The disks 208, 209 and 211 thus constitute a one way clutch.

The driving disk 211 is of a general shape shown in Fig. 3, being provided with a notch 215 cut therein and an extension 216. The extension 216 furnishes a support for a pin 217 to which one end of a tension spring 218 is secured. The other end of the tension spring 218 is fastened to a pin 219 mounted in the end pieces 30. The extension 216 abuts an adjusting screw 220 which is threaded through a supporting element 221 and adapted to be locked in position by a lock nut 222. The supporting element 221 is adapted to be threaded into one of the end pieces 30 (see Fig. 13). A driving disk 223 having a quill 224 telescopes the quill 207 of the end piece 30 (Fig. 13) of the main sealing device frame and is adapted to rotate about it.

A circular opening 225 is made in the disk 223 and a setscrew 226 is threaded therein to form a seat for a compression spring 227 resting against a ball 228 which bears against the quill 207. In this manner the frictional contact between the quills 224 and 207 may be adjusted.

The disk 223 is essentially in the form of a ratchet (see Fig. 3) and contains 6 notches 229 equally spaced about its periphery. One of these notches, notably the notch which has been designated with the reference character 230, the dotted outlines of which are shown in Fig. 3, is cut deeper than the remaining notches or ratchet teeth to permit the pawl 54 in certain positions to engage the notch 215 of disk 211 and drive the latter, the disk 208, and the shaft 121.

A cam member or disk of the general contour shown in Fig. 14 is secured adjacent the ratchet 223 upon the quill 224 thereof by means of a setscrew 232. The cam 231 co-operates with roller 202 and crank arm 200 to bring about movement of the knife operating shaft 140. The second cam member 233 is mounted upon the quill 224 adjacent to cam 231 by means of setscrew 234. The cam 233 is of the general contour shown in Fig. 15 and is adapted to co-operate with roller 192 on the bell crank 190 to bring about turning movement of the shaft 144 through the connecting rod 189. A third cam member 235 is adjustably mounted upon the quill 224 by means of a setscrew 225'. This cam is of the general shape shown in Fig. 16 and co-operates with the roller 103 and double-end operating lever 99 to bring about reciprocating movement of the folder stop 91 through the connecting rods 98 and 72.

A one way brake designated generally by the reference character 236 comprises essentially a disk 237, which may be constructed of fibre or other suitable material, and is affixed in any desired manner to the shaft 121, for example, by means of a key 238. The disk 237 is adapted to co-operate with several dogs 239 suitably distributed about the periphery rotatably mounted thereabout upon stub shafts 240, threaded into one of the end pieces 30.

Each of the dogs is held against the periphery of the disk 237 by means of a spring 241, fastened to each dog and to a pin 242 located in the end piece (see Figs. 13 and 17). It will be seen that the brake 236 permits rotation of the shaft 121 in one direction and prevents it in the other.

Attention is directed to the fact that there is an angular shaped member 245 (Fig. 4) mounted between the end pieces 108 by means of backwardly extending ears or lugs 246 secured thereon by machine screws 247. The angular member 245 co-operates with the face of the knife block 136 to form the seal into a V-shape.

Having described the detailed mechanical construction of the embodiment of our invention, we shall now explain its operation. For this purpose the operation of the folding machine and sealing device, from the time a sheet is first fed into the folding machine until it is delivered as a sealed folder, will be described.

The sheets of paper, such as 25, to be made into folders, are fed by the feeding mechanism 23 of the folding machine 21 onto the diagonally mounted rollers 24. The rollers 24 serve to carry the sheets 25 forward toward the folding mechanism 26 with their edges abutting a guide (not shown) on the lower side of the folding machine (Fig. 1). This feeding continues until the sheets 25 encounter the folding mechanism which consists of the usual feeding rollers and associated folding panels. One folding panel is employed for each fold to be made in the folder in the customary manner. The folding machine 21 and the folding mechanism 26 is designed to make folders either longitudinally or transversely.

In order to describe this folding action in a general way, the last folding operation of the folding mechanism 26, will be briefly set forth. The folder 187 which has been formed from one of the sheets 25 is fed between the rollers 35 and 37 (Fig. 3) and these rollers cause the folder to move into the folding panel 62 where the forward edge of the folder 187 encounters the stop 63 (Fig. 1) adjustably mounted therein and set for the size of the folder 187. Upon encountering this stop, a bend is made in the folder 187 and the further action of the feeding rollers 35 and 37 causes the bent portion of the folder to be fed between the rollers 37 and 39 where the last fold is made. The action of rollers 37 and 39 brings the folder 187 into the reversing panel 64.

As has been explained hereinbefore, the entire mechanism of the folding machine is driven from a motor which operates the driving pulley 22. The transversely mounted rollers 24, the feeding mechanism 23, and the folding rollers such as 35 and 37, are also driven from the driving pulley 22. The drive gear 50 for the sealing mechanism 28 is also geared to the folding mechanism so that it is constantly operating.

It will be recalled that the rollers 35, 37, 39 and 42 are all geared together and that the roller 42 has a gear 40 thereon meshing with an adjustably mounted gear 43 whereby the gear 46 is caused to rotate the shaft 47 which drives the folder feeding rollers 148. The folder feeding rollers 152 are frictionally driven through the feeding wheels 148, since they are in frictional contact therewith. The gear 46 also drives the gear 50 to which the pawl 54 is secured, causing the pawl 54 to be operated periodically to advance the driving disk 223 of the control mechanism 206 in a step by step manner.

The shaft 47 also brings about movement of the watering roller 164 through the gears 161 and 162. The movement of the watering roller 164 carries water from the watering pan 166 to the watering rollers 175 and 183 and the water retaining surfaces 165, 176 and 185.

The movement of the ratchet disk 223 brings about the turning movement of the cams 235, 233 and 231, which are secured to the quill 224. The movement of the cams 231, 233 and 235 control the rocking movement of the shafts 140 and 144 and the sliding movement of the adjustable stop or kick-off 90. The movement of the stop or kick-off 90 determines the timing at which a folder 187 is permitted to move between the feeding rollers 39 and 42. The rocking movement of the shaft 140 brings about a reciprocating motion of the movable knife block 136, carrying the lower knife 135 (see Fig. 4). The rocking movement of the shaft 144 controls the position of the seal holding element 142 and its ejecting operation.

Once upon every revolution of the driving ratchet 223, the pawl 54 moves into the notch 230 which is cut more deeply than the others, whereby the driving pawl 54 is permitted to engage the notch 215 of the disk 211. The movement of the disk 211 under the influence of pawl 54 brings about turning movement of the shaft 121 through the one-way clutch comprising the elements 209, 212 and the disk 208. The shaft 121 is thus rotated to a predetermined distance, depending upon the stroke of the pawl 54. We prefer to make this rotational movement a rotation of approximately seven-eighths of an inch along the circumference of the seal feeding roller 120. This is for the purpose of feeding precanceled postage stamps, if desired.

The movement of the shaft 121 brings about rotation of the seal feeding roller 120 to feed the tape 131 from which seals are made into the guide 130. The one-way brake 236 permits movement of the shaft 121 in one direction but prevents its movement in the other direction so as accurately to control the stamp feeding movement.

The movement of the shaft 121 also brings about movement of the friction roller 123 through the gears 125 and 126. At the time that the strip 131 is fed downwardly into the guide 130, the movable knife 135 is in its furtherest position, to the right (Fig. 4) to permit the seal tape to rest against the lip in the tape holding element 142.

The further movement of the cam 231 permits the movement of the knife 135 in the guides 134 under the influence of the spring 203 to bring the knife into the position shown in Fig. 4, thereby severing the seal 251, and by the co-operating action of the bracket 245, the surface 141 of the knife block and the seal retaining bracket 142 to form it into a V-shape preparatory to receiving a folder.

After sufficient time has elapsed to permit a folder to move from the feeding rollers 39 and 42 through the feeding wheels 148 and 152 toward the feeding rollers 58 and 52, the shaft 144 is rotated through the operation of the cam 233, bell crank 190 and connecting rod 189 so as to bring the seal retaining elements 142 into its ejecting position (see Fig. 11) whereby a seal 251 is ejected from the device in the event that prior to this time it has not been attached to the folder.

The cam 235 which controls the initial movement of the folder 187 between the feeding rollers 39 and 42 by controlling the trip action of the stop 90 is so shaped as to properly time the spacing of the folders through the sealing mechanism so that a seal 251 will always be in a position when there are any folders moving through the seal mechanism. This trip arrangement is quite adequate to take care of all contingencies of operation, since the fastest rate at which folders may be folded leaves a spacing of about two inches between each successive folder. The time that the trip mechanism 90 is out of position so as not to permit the usual movement of a folder between the rollers 39 and 40 would correspond to a half inch of travel of the folder.

The purpose of the spring 93 of the tripping mechanism 90 is to give a slight resiliency to the mounting of the stopping element 91. When the stopping element 91 is in the dotted position shown in Fig. 8, the open edge of the folder 187 is caused to move between the feeding rollers 39 and 42 (see Figs. 8 and 4), and is fed with the open edge leading in the direction of the sealing mechanism.

The feeding wheels 148 and 152 then hold the folder at spaced apart points and feed it through the sealing mechanism proper. The travel of the folder 187 through the sealing mechanism causes the watering wheels 175 and 183 to apply water to opposite sides 252 and 253 of the folder adjacent the open leading edge thereof, since these wheels are provided with water retaining surfaces and are supplied from the watering pan 166.

The further movement of the folder causes the water applying rollers 183 and 175 to separate so that the opposite sides 253 and 254 of the folder are only moistened the sufficient distance that the seal 251 will cover. The further movement of the folder 187 forces sides 252 and 253 thereof which have been moistened against the V-shaped notch of the seal 251, and the seal is applied to the moistened sides of the folder over the open leading edge thereof by its further movement in the direction of the feeding rollers 58 and 52. The roller 52 is driven on the shaft 51 while the roller 58 is resiliently mounted and floating thereabove so as to apply pressure to the seal folder. The sealed fender 142 co-operates with the lower portion of the knife block 136 so as to affix the seal 251 to the folders over the open leading edges thereof.

The watering rollers 183 and 175 are separated by the action of the folder itself engaging the legs 182 and 173 and rotating the brackets 180 and 171 about their pivots 181 and 163, respectively (see Fig. 10).

The folders 187, after being sealed, are fed from the rollers 52 and 58 into a packing container or shoot 255. The packing container may be provided to permit the weight of the folders themselves to bring about further adhering action of the seals if required. Obviously, a belt conveyor or other device may be employed at this point to convey the folders anywhere desired.

While we have described water being employed as a solvent to moisten or dissolve the glue or mucilage of the sealing tape, it will be obvious that any other liquid or chemical may be employed to co-operate with the type of seal used.

If it is desired to employ stamps as seals which may be obtained from a roll, the stroke of the pawl 54 and the diameter of the stamp feeding roller 120 is adjusted or co-related so that the movement of the shaft 121 brings about the feeding action of the stamp tape exactly the distance of one stamp which we have designated as seven-eighths of an inch.

It will be obvious that a similar relationship might be necessary in case the seal tape consisted of a number of peculiarly shaped seals joined together in the nature of a roll, or that certain printed material for advertising or other purposes be printed thereon.

It will be understood that it is impossible, when feeding and sealing several thousand folders per hour, to accurately cut the seal between stamps or along the perforations. No matter how accurate the mechanism may be designed, it is subject to wear, which will throw out the adjustment. It will be noted that in Fig. 13 we have shown a hand wheel 205 by which the stamp feeding shaft 21 might be turned manually. This permits accurate framing or positioning of the stamps or seals so that one complete stamp will be applied properly to each folder. This adjustment of the wheel 205 can be made while the machine is in full operation, and it is only necessary for the operator to observe the manner in which seals are being attached to the folders to keep absolutely accurate adjustment of such application.

In the event that the feeding device 23 of the folding machine 21 does not operate properly so that the spacing between successive folders or sheets of paper is the same, the adjustable trip 91 brings about the proper timed relationship of the folder as it is passing through the sealing mechanism. In the event the sealing mechanism does not feed folders for some time, the seal ejecting device 142 on the shaft 144 ejects the seals so that only one will be applied when a folder does not come through the sealing mechanism.

Attention is directed to the fact that the sealing mechanism is adjustably mounted on the rods 31 so that it may be positioned transversely on the folding machine within the main sealing device frame 29, by adjusting the thumbscrews 112 and 115 to be properly positioned for any size folder to which it is desired to attach a seal. The reversing trip or stop 90 is also adjustable for the various shapes and sizes of folders.

The stopping member 91 is so designed and shaped to feed the folders 187 evenly between the feeding rollers 39 and 42.

It should be noted that the peripheral speed of the watering rollers 175 and 183 is the same as the peripheral speed of the driving wheels 152 and 148, as well as the same as the peripheral speed of the driven feeding rollers, so that there will be no wiping action of the watering wheels as the folder is passing through. The swinging brackets 171 and 180 swing together again after a folder passes between them in order to permit the upper watering wheel to become moistened between successive folders.

It will be appreciated that in the mechanism thus far described, the seals would continue to be fed into the sealing mechanism irrespective of whether sheets of paper are being fed into the folding mechanism. In accordance with our invention, however, the feeding of seals is prevented in the event no sheets are being fed into the folding mechanism, and in the embodiment of the invention herein described, this result is brought about in the following manner.

The feeding device 23 may be of any suitable construction and, as herein shown, is of the same general type as that disclosed in Patent No. 1,672,412 granted June 5, 1928, to R. Hitchcock. This device 23 includes a hollow perforated suction wheel 23$^a$ for feeding the sheets to the folding mechanism, and a nozzle 23$^b$ communicating with the interior of said wheel through an opening in one side thereof (Fig. 1). Suction wheel 23$^a$ is driven by the usual or any suitable means for this purpose, in the proper direction to feed the sheets from a supply thereof on the device 23 to the folding mechanism.

The nozzle 23$^b$ is secured to or formed integrally with a hollow arm 23$^c$ which, in turn, is secured to or formed on a hollow bracket 23$^d$. This bracket 23$^d$ is secured in any suitable manner to the frame of the device 23 and communicates at one end with a pipe or conduit 23$^e$ which, in turn, communicates with a flexible conduit 23$^f$ connected with the exhaust side of a pump 23$^g$ by a T-union 23$^h$. The pump 23$^g$ may be of any suitable type capable of creating suction in the wheel 23$^a$ through the described connections therefor with said pump. The pump 23$^g$ is, however, preferably of the rotary type and includes a pump shaft 23$^i$ driven by the main drive shaft pulley 22 through suitable connections therebetween.

Figure 18:
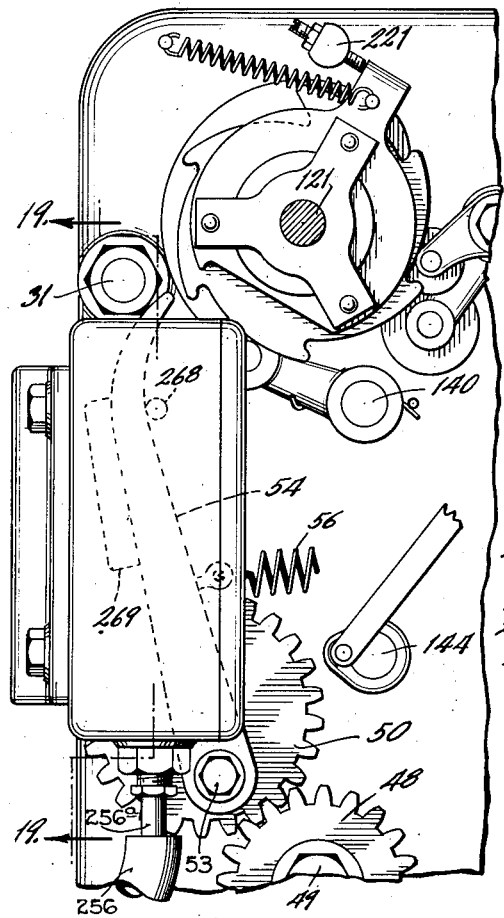
Fig. 18 is a detail elevation of our improved control mechanism.
Figure 19:
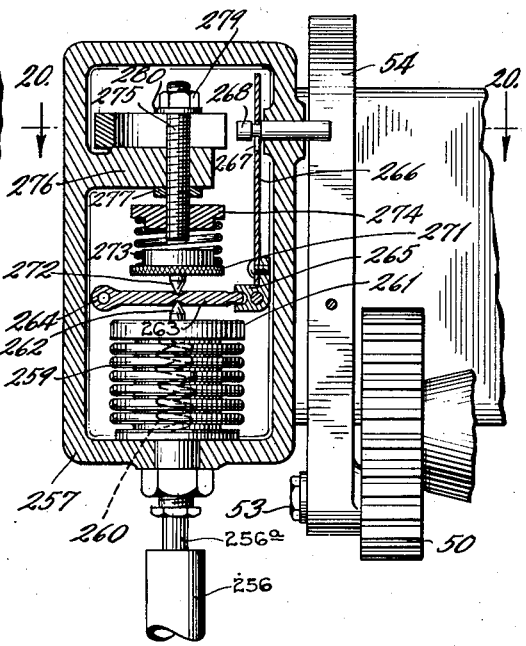
Fig. 19 is a sectional elevation of the same taken along line 19—19 of Fig. 18 looking in the direction of the arrows.
Figure 20:
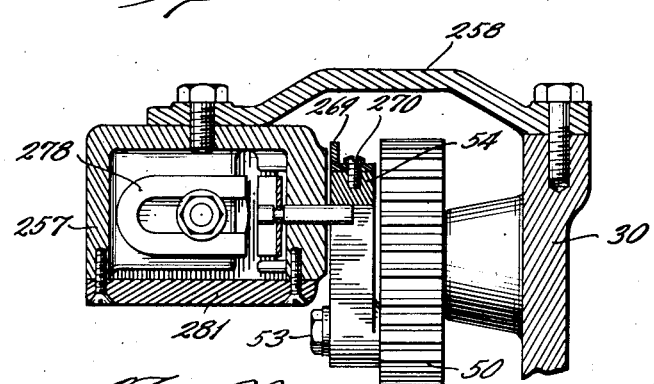
Fig. 20 is a horizontal sectional view of the same taken along the line 20—20 of Fig. 19 looking in the direction of the arrows.

The T-union 23$^h$ has connected therewith one end of a flexible pipe or conduit 256 the opposite end of which is connected with a nipple 256$^a$ that is secured to and extends through a housing 257 mounted on one of the end pieces 30 of the sealing device frame by means of a bracket 258 (Figs. 18, 19 and 20). The nipple 256$^a$ is also secured to, and communicates with the interior of, a bellows 259 having a spring 260 therein. The end of the bellows 259 is provided with a metal cover 261 having a projecting pin 262 secured thereto and bearing against the lever arm 263 which is pivoted at one of its ends on a pin 264 secured to the housing 257. The other end of the lever arm 263 engages a bell crank 265 which has secured to it a flat leaf-spring 266. The leaf-spring 266 is provided with a slot 267 therein through which a pin or stop 268 extends. The pin 268 projects through an opening in the housing 257 at such point as to abut the pawl 54 and prevent it from engaging the driving ratchet 223 when the pin 268 is in operative position.

An angular guide 269 is secured to the pawl 54 in any suitable manner, as by machine screws 270, in order to provide extra width for the pawl and prevent the pin from moving in behind it, should the bellows be operative when said pawl is in position to operate the ratchet 223.

A spring seat 271, having a pin 272, bears against the opposite side of the lever arm 263 and is engaged by one end of a compression spring 273, the other end of which bears against a spring seat 274 into which an adjusting screw 275 is threaded. The adjusting screw 275 is also threaded through an inwardly extending flanged portion 276 of the housing 257. A lock nut 277 cooperates with the flange 276 to lock the screw 275 in position.

A permanent magnet 278 is mounted on the upper surface of the flange 276 and secured thereto by a nut 279 and a clamping washer 280.

The housing 257 completely encloses the mechanism therein in order to protect the same, and said housing may be provided with a cover 281 removably secured thereon to render said mechanism accessible for purposes of adjustment and repair.

The position of the pin 268, as shown in Figs. 19 and 20, is to render the operation of the pawl 54 ineffective to move the controlling cams. This is the position of the mechanism when the suction feeder 23 is not feeding sheets of paper into the folding machine.

Under this condition, there will be no sheet or sheets engaged by wheel 23$^a$, and the suction side of pump 23$^g$ and the interior of bellows 259 are open to atmosphere through perforations of wheel 23$^a$, the nozzle 23$^b$, and the described tubular connections for the bellows and pump with said nozzle. Increased pressure is thus produced within the bellows 259 which, together with the spring 260, causes said bellows to expand, overcome the action of spring 273, move levers 263, 265 and leaf-spring 266, and force pin 268 into the path of movement of pawl 54 so that operation of the sealing mechanism is prevented.

When the feeder is thrown into operation, the sheet or sheets engage wheel 23$^a$ and close nozzle 23$^b$, the suction side of pump 23$^g$, and the interior of bellows 259, to atmosphere. Pressure in bellows 259 is thus reduced and it contracts so that reverse action of the control mechanism is produced, pin 268 is withdrawn from the path of travel of pawl 54, and operation of the sealing mechanism is initiated and proceeds as before described. When the pin 268 is removed from the path of travel of the pawl 54, the magnet 278 cooperates with the leaf-spring 266 to give said pin a snapping action in its movement to inoperative position.

While one embodiment of our invention is herein illustrated and described with more or less particularity, it is to be expressly understood that said invention is not limited to this embodiment or otherwise than by the terms of the appended claims.

We claim:

1. In a sealing machine, mechanism for applying a seal to the open edges of a folder, means for moving folders through said mechanism, and folder controlled means for moistening the edges of each folder over a predetermined area.

2. In a sealing machine, mechanism for applying a seal to the open edges of a folder, means for moving folders through said mechanism, and rotatable folder controlled means for moistening the edges of each folder over a predetermined area at the point the seal is to be applied.

3. In a sealing machine, mechanism for applying a seal to the open edge of a folder, means for feeding folders through said mechanism, relatively movable folder controlled rollers for moistening a small section of each side of each folder adjacent the open edge thereof, and means for operating said mechanism to apply the seal on the folder over said edge and the moistened sections of said folder.

4. In a sealing machine, mechanism for applying a seal to the open edges of a folder, means for moving folders through said mechanism, and means controlled by the travel of the folder through said mechanism for moistening the open edges of each folder to adapt it to receive the seal.

5. In apparatus of the character described, mechanism for applying seals on folders over open leading edges thereof, means for reversing and feeding folders into said mechanism with open edges of the folders leading, means for folding paper sheets into folders and delivering them to the reversing and feeding means, and means with opposite closed edges of said folders leading for operating said seal applying mechanism from said folding and delivering means at a uniform speed in relation therewith to apply a seal to the open leading edge of each folder.

6. In a sealing machine, folder feeding mechanism, folder controlled means for moistening predetermined areas on opposite sides of the folders adjacent open leading edges thereof, means for feeding a strip of postage stamps, means for cutting stamps in succession from the strip and applying them on successive folders over said edges and said moistened areas, and means for varying the feed of said strip to insure cutting of whole stamps therefrom and application of the same to the folders as aforesaid.

7. In a sealing machine, mechanism for applying seals to folders, means for feeding folders through said mechanism, means for supporting a roll of tape, means for cutting the tape into straps to form seals to be applied to folders, and means for ejecting from said machine such straps as are not used as folder seals.

8. In a sealing machine, means for supporting a roll of tape, means for cutting the tape into straps, mechanism for conveying folders through the sealing machine, said roll of tape being mounted above the path of travel of said folders, and means for bending and placing a strap in the path of travel of each folder to seal an open edge thereof.

9. In a sealing machine, means for supporting a roll of gummed tape, means for cutting the tape into straps, means for feeding said tape, mechanism for conveying folders through said sealing machine, and means for ejecting such straps as are not used.

10. In a sealing machine, means for supporting a roll of gummed tape, means for feeding said tape, means for cutting the tape as it is fed into straps, mechanism for conveying folders through the sealing machine, means for applying the gummed straps on the folders over open edges thereof, means for ejecting such straps as are not used, and means for controlling said tape feeding and cutting and ejecting means.

11. In apparatus for folding and sealing a sheet, sealing mechanism, sheet feeding mechanism, and means controlled by the sheet being fed for controlling the sealing mechanism.

12. In apparatus of the character described, sealing mechanism, suction sheet feeding mechanism, and suction controlled means controlling the operation of said sealing mechanism and controlled through the presence or absence of a sheet relative to said suction sheet feeding mechanism.

13. In apparatus of the character described, sealing mechanism, sheet feeding mechanism, moistening mechanism operating in conjunction with the sealing mechanism, and means controlling the operation of the sealing mechanism and the moistening mechanism and controlled through the presence or absence of a sheet relative to said sheet feeding mechanism.

14. In a sealing machine, mechanism for feeding a folder with an open edge thereof leading, folder controlled means for moistening predetermined areas on opposite sides of the folder adjacent the open leading edge thereof, and mechanism for applying a gummed seal on said folder over said edge and said moistened areas.

15. In a sealing machine, mechanism for feeding a folder with an open edge thereof leading, means for moistening predetermined areas on opposite sides of the folder adjacent the open leading edge thereof, means for supplying a gummed seal and bending it in position to receive the open leading edge of the folder, and means for affixing the gummed seal on the folder over said edge and said areas.

16. In mechanism of the character described, means for receiving a folder with a closed edge thereof leading, means for reversing the folder and feeding it with an opposite open edge thereof leading, means for moistening predetermined areas on opposite sides of the folder adjacent its open leading edge, and means for applying a gummed seal on said folder over said open leading edge and said moistened areas.

17. In mechanism of the character described, means for feeding a folder with an open edge thereof leading, means for moistening predetermined areas on opposite sides of the folder adjacent the open leading edge thereof, means for feeding a gummed strip, means for cutting a seal from said strip and bending said seal in position to receive the open leading edge of the folder between opposed gummed portions of the seal, and means for affixing said seal on said folder over said edge and said moistened areas.

18. In mechanism of the character described, means for rotatably supporting a roll of gummed material in tape-like form, means for feeding a strip of the gummed tape-like material from said roll, means for separating gummed seals one after another from said strip and bending them in position to receive open leading edges of folders between opposed gummed portions of the seals, means for moistening predetermined areas on opposite sides of the folders adjacent the open leading edges thereof, means for feeding the folders successively through the moistening means into successive bent seals with the open edges of the folders leading, and means for affixing the gummed seals successively on successive folders over said edges and said moistened areas.

19. In mechanism of the character described, means for feeding a gummed strip of material, means for separating gummed seals one after another from said strip and bending them in position to receive open leading edges of folders between opposed gummed portions of the seals, means for moistening predetermined areas on opposite sides of the folders adjacent the open leading edges thereof, means for receiving the folders successively with closed edges thereof leading and reversing and feeding the folders through said moistening means with opposite open edges of the folders leading, means for feeding the folders successively into successive bent seals past said separating and bending means with said open edges of the folders leading, and means for affixing the gummed seals successively on successive folders over said open leading edges and said moistened areas.

20. In a machine of the character described, a set of three driven rollers, means at one side thereof for receiving folders in succession from two of the rollers with closed edges of the folders leading, means for applying seals on the folders successively over opposite open edges thereof, means including one of said two rollers and the third roller for delivering the folders one after another from said first named means to the seal applying means with said open edges of the folders leading, and connections between one of the rollers and said seal applying means for operating the latter continuously during the operation of said rollers.

21. In a machine of the character described, a set of three rollers each disposed adjacent another in parallel relation therewith, means at one side of the set of rollers for receiving folders in succession from two of the rollers with closed edges of the folders leading, means for applying seals on the folders successively over opposite open edges thereof, means including one of said two rollers and the third roller for delivering the folders one after another from said first named means to the seal applying means with said open edges of the folders leading, means for driving the rollers, and driving connections between the rollers and the seal applying means for operating the latter while said rollers are being driven.

22. In a machine of the character described, a set of three rollers each disposed adjacent another in parallel relation therewith, means at one side of the set of rollers for receiving folders in succession from two of the rollers with closed edges of the folders leading, means for applying seals on the folders successively over opposite open edges thereof, means including one of said two rollers and the third roller for delivering the folders one after another from said first named means to the seal applying means with said open edges of the folders leading, a motor for both driving the rollers and operating the seal applying means, and means for causing said motor to operate said seal applying means at a uniform speed.

23. In a machine of the character described, a set of three rollers each disposed adjacent another in parallel relation therewith, means at one side of the set of rollers for receiving folders in succession from two of the rollers with closed edges of the folders leading, means for producing seals successively and applying them on the folders one after another over opposite open edges thereof, means including one of said two rollers and the third roller for delivering the folders successively from said first named means to the seal producing and applying means with said open edges of the folders leading, a motor for both driving the rollers and operating the seal producing and applying means, and means for causing said motor to operate the seal producing and applying means at a uniform speed in accordance with the speed at which said rollers are driven.

24. In a machine of the character described, a set of three driven rollers, means at one side thereof for receiving folders in succession from two of the rollers with closed edges of the folders leading, mechanism for moistening opposite side portions of each folder adjacent an opposite open edge thereof and for applying a gummed seal on each folder over its moistened portions and open edge, and means including one of said two rollers and the third roller for delivering the folders one after another from said first named means to said mechanism with the open edge of each folder leading.

25. In a machine of the character described, a set of three driven rollers, means at one side thereof for receiving folders in succession from two of the rollers with closed edges of the folders leading, mechanism for moistening opposite side portions of each folder adjacent an open edge thereof opposite its closed edge, mechanism for applying gummed seals on the folders over their open edges and moistened portions aforesaid, and means including one of said two rollers and the third roller for delivering the folders one after another from said first named means to said mechanisms with said open edges of the folders leading.

26. In a machine of the character described, means for supporting a roll of postage stamps and feeding a strip therefrom, means for cutting single stamps one after another from said strip and for bending them in like manner, and means for successively applying the cut and bent stamps on successive folders over open edges thereof to seal the same.

27. In a machine of the character described, means for supporting a roll of postage stamps, means for cutting single stamps one after another from said roll and for bending them in like manner, means for successively applying the cut and bent stamps on successive folders over open edges thereof to seal the same, and means for moistening portions of each folder on opposite sides thereof adjacent its open edge prior to the time the cut and bent stamps are applied to the folders as aforesaid.

28. In a machine of the character described, means for supporting a roll of gummed postage stamps, means for feeding a strip of the stamps from said roll, means for cutting single stamps one after another from said strip and for simultaneously bending each stamp as it is cut, means for successively applying the cut and bent stamps on successive folders over open edges thereof to seal the same, and means for moistening an area equal to the area of a stamp along the open edge of each folder at opposite sides thereof prior to the application of a stamp thereto.

29. In a machine of the character described, a set of three rollers each disposed adjacent another in parallel relation therewith, means at one side of the set of rollers for receiving a folder from two of the rollers with a closed edge of the folder leading, means for applying a seal on the folder over an opposite open edge thereof, common driving means for the set of rollers and the seal applying means, means for feeding the folder from said first named means to the seal applying means with said open edge of the folder leading, said feeding means comprising one of said two rollers and the third roller, and means operative to control the movement of each folder so as to cause it to pass through the seal applying means at a predetermined time.

30. In sealing apparatus for use with a folding machine having mechanism from which a folded product is delivered with a closed edge thereof leading, means adapted to be mounted on the folding machine for receiving the folded product from said mechanism with said closed edge of the product leading and for delivering the product with an opposite open edge thereof leading, and mechanism adapted to be mounted on said machine and comprising means for receiving the product from said first named means with said open edge of the product leading, means for moistening predetermined areas on both sides of the product adjacent the open edge thereof aforesaid, and means for applying a gummed seal on said product over said open edge and moistened areas thereof.

31. In sealing apparatus for use with a folding machine having mechanism from which a folded product is delivered with a closed edge thereof leading, mechanism adapted to be mounted on the folding machine and comprising means for applying a gummed seal on an opposite open edge of the product, means for moistening predetermined areas on both sides of the product adjacent said open edge prior to application of the seal as aforesaid, means for feeding a gummed strip from a roll to the seal applying means, and means for separating the seal from said strip, and means adapted to be mounted on said machine between said mechanisms for receiving the folded product from said first named mechanism with said closed edge of the product and for delivering said product to said seal applying means with said open edge of the product leading.

32. In sealing apparatus for use with a folding machine having mechanism from which a folded product is delivered with a closed edge thereof leading, means adapted to be mounted on the folding machine for receiving the folded product from said mechanism with said closed edge leading and for delivering the product with an opposite open edge thereof leading, mechanism adapted to be mounted on said machine and comprising means for receiving the product from said first named means with said open edge leading, means for moistening predetermined areas on both sides of the product adjacent the open edge thereof aforesaid, and means for applying a gummed seal on the product over said open edge and moistened areas thereof, and means controlled by the product through travel of same in the apparatus and controlling the operation of said moistening means.

33. In sealing apparatus for use with a folding machine having mechanism from which a folded product is delivered with a closed edge thereof leading, means adapted to be mounted on the folding machine for receiving the product from said mechanism with the closed edge of the product leading, a movable device for delivering the product from said means with an opposite open edge of the product leading, mechanism for operating the delivering device, and mechanism adapted to be mounted on said machine for receiving the product from said device with the open edge of the product leading and for applying a seal on said product over said open edge thereof.

34. In sealing apparatus for use with a folding machine having mechanism from which a folded product is delivered with a closed edge thereof leading, means including a panel or receiver adapted to be mounted on the folding machine for receiving the product from said mechanism with the closed edge of the product leading, a movable device associated with the panel or receiver for delivering the product therefrom with an opposite open edge of the product leading, mechanism for operating the movable device, and mechanism adapted to be mounted on said machine for receiving the product from said movable device with the open edge of the product leading and for applying a seal on said product over said open edge thereof.

35. In sealing apparatus for use with a folding machine having mechanism from which a folded product is delivered with a closed edge thereof leading, feeding and receiving means adapted to be mounted on the folding machine including feed devices for receiving the product from said mechanism with the closed edge of the product leading and a panel or receiver to which the product is fed from said feed devices with said edge leading, a slidably mounted device associated with the panel or receiver for delivering the product therefrom with an opposite open edge of said product leading, mechanism for receiving the product from the slidably mounted device with the open edge of the product leading and for applying the seal on said product over said open edge thereof, and means for reciprocating said slidably mounted device and for operating said last named mechanism.

36. In a sealing machine, a two part frame, means for separately mounting the parts thereof in closely spaced relation whereby they provide a passage therebetween and hold a folded product closed as it is fed through the passage with an open edge leading, and mechanism on said frame for applying a seal on the folded product over said edge as said product is fed through said passage and held closed as aforesaid.

37. In a sealing machine, a two part frame, means for separately mounting the parts thereof in closely spaced relation whereby they provide a passage therebetween and hold a folded product closed as it is fed through the passage with an open edge leading, mechanism disposed on the frame parts for moistening predetermined areas on both sides of the product adjacent its open leading edge, and means on said frame for applying a gummed seal on the product over said edge and moistened areas as said product is fed through said passage and held closed as aforesaid.

38. In a sealing machine, a two part frame, means for separately mounting parts thereof in closely spaced relation whereby they provide a passage therebetween and hold a folded product closed as it is fed through the passage with an open edge leading, mechanism disposed on the frame parts for moistening predetermined areas on both sides of the product adjacent its open leading edge, mechanism on said frame comprising means for applying a gummed seal on the product over said edge and moistened areas as the product is fed through said passage and held closed as aforesaid, mechanism on the frame comprising strip feeding means for serving the seal applying means and means for separating the seal from the strip, and mechanism for operating said strip feeding and seal separating means.

39. In the sealing machine, a two part frame, means for separately mounting the parts thereof in closely spaced relation whereby they provide a passage therebetween and hold a folded product closed as it is fed through the passage with an open edge leading, mechanism on said frame for applying a seal on the folded product over said edge as said product is fed through said passage and held closed as aforesaid, and driven means for feeding the product through the passage and past said seal applying mechanism.

40. In a sealing machine, a two part frame, means for separately mounting the parts thereof in closely spaced relation whereby they provide a passage therebetween and hold a folded product closed as it is fed through the passage with an open edge leading, mechanism disposed on the frame parts at opposite sides of the passage for moistening predetermined areas on both sides of the product adjacent its open leading edge, mechanism on said frame for applying a seal on the folded product over said edge and moistened areas as said product is fed through the passage and held closed as aforesaid, and means extending across the passage actuated by the product as it is fed therethrough and controlling the operation of said moistening mechanism.

RAY OHLSEN.
ANTON J. KNUTKOWSKI.